(12) United States Patent
Jeong et al.

(10) Patent No.: US 12,437,557 B2
(45) Date of Patent: Oct. 7, 2025

(54) METHOD, APPARATUS, AND COMPUTER PROGRAM FOR EXTRACTING TRAFFIC SIGNAL INFORMATION THROUGH IMAGE DATA ANALYSIS INCLUDING TRAFFIC LIGHT

(71) Applicant: RideFlux Inc., Jeju-si (KR)

(72) Inventors: Hawook Jeong, Jeju-si (KR); Hee Kon Kim, Jeju-si (KR); Jung Hee Park, Seoul (KR)

(73) Assignee: RideFlux Inc., Jeju-si (KR)

( * ) Notice: Subject to any disclaimer, the term of this patent is extended or adjusted under 35 U.S.C. 154(b) by 513 days.

(21) Appl. No.: 17/929,716

(22) Filed: Sep. 5, 2022

(65) Prior Publication Data

US 2023/0071709 A1 Mar. 9, 2023

(30) Foreign Application Priority Data

Sep. 6, 2021 (KR) .......... 10-2021-0118204

(51) Int. Cl.
*G06V 20/58* (2022.01)
*G06V 10/25* (2022.01)

(52) U.S. Cl.
CPC ............ *G06V 20/584* (2022.01); *G06V 10/25* (2022.01)

(58) Field of Classification Search
CPC ...... G06V 20/584; G06V 10/25; G08G 1/095; G06T 7/11; H04N 7/18
See application file for complete search history.

(56) References Cited

U.S. PATENT DOCUMENTS

| | | | |
|---|---|---|---|
| 10,290,210 B2 * | 5/2019 | Wolterman | G08G 1/096716 |
| 11,155,249 B2 * | 10/2021 | Ben Shalom | B60T 7/18 |
| 2017/0262709 A1 * | 9/2017 | Wellington | G06V 10/764 |
| 2018/0211530 A1 * | 7/2018 | Sarkar | G06V 20/584 |

FOREIGN PATENT DOCUMENTS

| | | |
|---|---|---|
| KR | 10-2016-0148850 A | 12/2016 |
| KR | 10-2017-0037695 A | 4/2017 |
| KR | 10-2021-0039245 A | 4/2021 |

* cited by examiner

Primary Examiner — Matthew C Bella
Assistant Examiner — Andrew B. Jones
(74) Attorney, Agent, or Firm — Studebaker Brackett PLLC

(57) ABSTRACT

Provided are a method, an apparatus, and a computer program for extracting signal information through image data analysis including a traffic light. The method of extracting, by a computing apparatus, signal information through image data analysis including a traffic light according to various embodiments of the present disclosure includes collecting image data obtained by capturing an image in front of a vehicle, identifying a traffic light by analyzing the collected image data, and extracting signal information from the identified traffic light.

8 Claims, 8 Drawing Sheets

METHOD, APPARATUS, AND COMPUTER PROGRAM FOR EXTRACTING TRAFFIC SIGNAL INFORMATION THROUGH IMAGE DATA ANALYSIS INCLUDING TRAFFIC LIGHT

CROSS-REFERENCE TO RELATED APPLICATION

This application claims priority to and the benefit of Korean Patent Application No. 2021-0118204, filed on Sep. 6, 2021, the disclosure of which is incorporated herein by reference in its entirety.

BACKGROUND

1. Field of the Invention

Various embodiments of the present invention relate to a method, apparatus, and computer program for extracting signal information through image data analysis including traffic lights.

2. Discussion of Related Art

In recent years, as a penetration rate of vehicles increases, congested sections are increasing on a road regardless of a time zone. As a result, drivers feel bored while driving in the congested section, so the drivers may stare at other places for a long time or drive drowsy. As such, when drivers do not focus on driving and do not recognize a departure of front vehicles while performing other actions, there is a problem in that the drivers are stressed by interrupting a flow of vehicles or being startled by horns from rear vehicles.

To this end, conventionally, by analyzing image data captured in front of a vehicle, recognizing signal information of traffic lights, providing a departure notification according to the signal information, or recognizing a departure of a front vehicle according to a distance from the front vehicle to provide a departure notification, a driver assistance system capable of preventing drivers from being unable to start by taking other actions without focusing on driving is being developed.

Meanwhile, in the case of the conventional driver assistance system, particularly, in the case of a method of providing a departure notification through image data analysis, when a plurality of traffic lights are installed in adjacent positions such as an intersection, there is a problem in that it is difficult to distinguish which of the plurality of traffic lights are traffic lights corresponding to a current vehicle, that is, there is a problem of the signal information of what traffic light should be considered in order to provide a departure notification to a current vehicle only by analyzing image data.

In addition, the conventional driver assistance system that provides a departure notification according to a distance from a front vehicle has a problem in that separate components such as a radar sensor or a high-performance computing apparatus are required to calculate the distance from the front vehicle, and a problem in that it is difficult to be utilized when there is no front vehicle (e.g., when waiting in front for a signal, and the like).

RELATED ART DOCUMENT

Patent Document

Korean Patent Laid-Open Publication No. 10-2006-0114826 (Nov. 11, 2006)

SUMMARY OF THE INVENTION

The present disclosure is directed to providing a method, an apparatus, and a computer program for extracting signal information through image data analysis including traffic lights capable of more accurately extracting signal information corresponding to a traveling route of a vehicle by accurately identifying traffic lights corresponding to a vehicle only using image data obtained by capturing an image in front of the vehicle and a traveling route of the vehicle and extracting signal information from the identified traffic lights, that is, only by a relatively simple operation without using a precision map or a high-performance computing apparatus.

The present disclosure is directed to providing a method, an apparatus, and a computer program for extracting signal information through image data analysis including traffic lights capable of improving power efficiency according to performing a relatively low-computational operation as well as preventing a situation where a flow of traffic is obstructed by missing a departure signal due to a vehicle driver's negligence by determining a driving control command of an autonomous vehicle in some cases as well as providing a departure notification for a vehicle waiting for a signal using signal information extracted from image data.

Objects of the present invention are not limited to the objects described above, and other objects that are not mentioned may be obviously understood by those skilled in the art from the following description.

According to an aspect of the present disclosure, there is provided a method of extracting, by a computing apparatus, signal information through image data analysis including a traffic light, including: collecting image data obtained by capturing an image in front of a vehicle, identifying a traffic light by analyzing the collected image data, and extracting signal information from the identified traffic light.

The extracting of the signal information may include determining whether a first vehicle is waiting for a signal using location information of the first vehicle collected through a location sensor provided in the first vehicle, and extracting the signal information from the identified traffic light in response to the determination that the first vehicle is waiting for the signal.

The extracting of the signal information may include determining whether the first vehicle is waiting for the signal by analyzing the image data obtained by capturing an image in front of the first vehicle, and extracting the signal information from the identified traffic light in response to determining that the first vehicle is waiting for the signal.

The identifying of the traffic light may include selecting any one of a plurality of identified traffic lights based on a traveling route of the vehicle when the plurality of traffic lights are identified by analyzing the collected image data, and setting a region corresponding to any one of the selected traffic lights in the collected image data as a region of interest (ROI), and the extracting of the signal information may include extracting the signal information on the vehicle by analyzing only the set ROI.

The setting of the ROI may include selecting any one of two or more traffic lights as a traffic light corresponding to the traveling route of the vehicle using an attribute of the signal information output from each of the two or more traffic lights when there are the two or more traffic lights selected from the plurality of identified traffic lights based on the traveling route of the vehicle, the attribute of the signal information including an output form of the signal information, and selecting any one of the two or more traffic lights as the traffic light corresponding to the traveling route of the vehicle using at least one of road guide signs installed at adjacent locations of the two or more traffic lights and an attribute of the vehicle. The identifying of the traffic light may include selecting any one traffic light outputting signal information corresponding to a current operating state of the vehicle from the plurality of identified traffic lights when the plurality of traffic lights are identified by analyzing the collected image data, and setting a region corresponding to any one of the selected traffic lights as an ROI in the collected image data, and the extracting of the signal information may include extracting the signal information on the vehicle by analyzing only the set ROI.

The identifying of the traffic light may include selecting any one of the plurality of identified traffic lights by comparing an operation pattern of the vehicle for a predetermined period and a change pattern of the signal information output from each of the plurality of identified traffic lights for the predetermined period when the plurality of traffic lights are identified by analyzing the collected image data, and setting a region corresponding to any one of the selected traffic lights as an ROI in the collected image data, and the extracting of the signal information may include extracting the signal information on the vehicle by analyzing only the set ROI.

The identifying of the traffic light may include: when a plurality of traffic lights are identified by analyzing the collected image data, setting a region corresponding to the preset traffic light as an ROI in the collected image data when there is a preset traffic light corresponding to a traveling route of the vehicle among the plurality of identified traffic lights based on location data of traffic lights for each pre-stored traveling route; and when there is no preset traffic light corresponding to the traveling route of the vehicle among the plurality of identified traffic lights, selecting any one of the plurality of identified traffic lights using the traveling route of the vehicle and signal information output from the plurality of identified traffic lights, setting a region corresponding to any one of the selected traffic lights as the ROI in the collected image data, and updating the location data of the traffic lights for each pre-stored traveling route using information on the traveling route of the vehicle and any one of the selected traffic lights.

The method may further include: when the vehicle is waiting for a signal, providing a departure notification for the vehicle based on the extracted signal information and movement information of the vehicle, in which the providing of the departure notification may include providing the departure notification for guiding departure of the vehicle when the movement of the vehicle is not detected until a preset time is exceeded based on a time when the extracted signal information changes from a red signal to a green signal and determining an attribute of the departure notification to be provided to the vehicle based on a length of time that the movement of the vehicle is not detected.

According to another aspect of the present disclosure, there is provided an apparatus for extracting signal information through image data analysis including a traffic light, including: a processor; a network interface; a memory; and a computer program loaded into the memory and executed by the processor, in which the computer program may include: an instruction to collect image data obtained by capturing an image in front of a vehicle; an instruction to identify the traffic light by analyzing the collected image data; and an instruction to extract signal information from the identified traffic light.

According to still another aspect of the present disclosure, there is provided a computer program recorded on a computer-readable recording medium, the computer program in combination with a computing apparatus to execute the following operations: collecting image data obtained by capturing an image in front of a vehicle; identifying the traffic light by analyzing the collected image data; and extracting signal information from the identified traffic light.

Other specific details of the present invention are included in the detailed description and accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
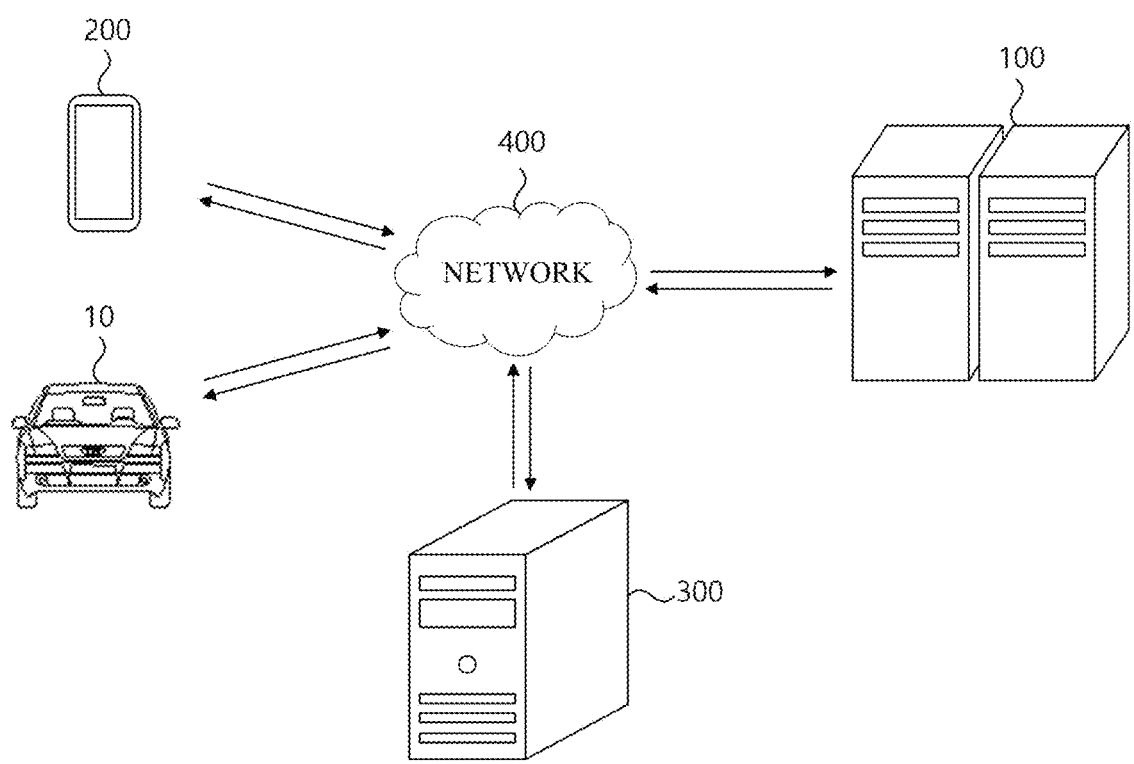
FIG. 1 is a diagram illustrating a system for extracting signal information through image data analysis including traffic lights according to an embodiment of the present invention.

Various advantages and features of the present disclosure and methods accomplishing them will become apparent from the following description of embodiments with reference to the accompanying drawings. However, the present disclosure is not limited to exemplary embodiments to be described below and may be implemented in various different forms, these exemplary embodiments are provided only in order to make the present disclosure complete and allow those skilled in the art to completely recognize the scope of the present disclosure, and the present disclosure is defined by the scope of the claims.

Terms used in the present specification are for explaining embodiments rather than limiting the present disclosure. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components described and includes all combinations thereof. Although "first," "second," and the like are used to describe various components, it goes without saying that these components are not limited by these terms. These terms are used only to distinguish one component from other components. Therefore, it goes without saying that the first component described below may be the second component within the technical scope of the present disclosure.

Unless defined otherwise, all terms (including technical and scientific terms) used in the present specification have the same meaning as meanings commonly understood by those skilled in the art to which the present invention pertains. In addition, terms defined in commonly used dictionaries are not ideally or excessively interpreted unless explicitly defined otherwise.

Further, the term "unit" or "module" used herein means a hardware component such as software, a field-programmable gate array (FPGA), or an application-specific integrated circuit (ASIC) and performs predetermined functions. However, the term "unit" or "module" is not meant to be limited to software or hardware. The "unit" or "module" may be configured to be stored in an addressable storage medium or may be configured to reproduce one or more processors. Accordingly, for example, the "unit" or "module" includes components such as software components, object-oriented software components, class components, and task components, processors, functions, attributes, procedures, subroutines, segments of program code, drivers, firmware, microcode, a circuit, data, a database, data structures, tables, arrays, and variables. Functions provided in components, and the "units" or "modules" may be combined into fewer components, and "units" or "modules" or further separated into additional components, and "units" or "modules."

Spatially relative terms "below," "beneath," "lower," "above," "upper," and the like may be used to easily describe the correlation between one component and other components as illustrated in drawings. The spatially relative terms should be understood as terms including different directions of components during use or operation in addition to the directions illustrated in the drawings. For example, in a case of turning over a component illustrated in the drawings, a component described as "below" or "beneath" another component may be placed "above" another component. Therefore, the illustrative term "below" may include both downward and upward directions. The components can also be aligned in different directions, and therefore the spatially relative terms can be interpreted according to the alignment.

In this specification, the computer means all kinds of hardware devices including at least one processor, and may be understood as including a software configuration which is operated in the corresponding hardware device according to the embodiment. For example, the computer may be understood as a meaning including all of smart phones, tablet PCs, desktops, notebooks, and user clients and applications running on each device, but is not limited thereto.

Hereinafter, embodiments of the present invention will be described in detail with reference to the accompanying drawings.

Each operation described in the present specification is described as being performed by a computer, but subjects of each operation are not limited thereto, and according to embodiments, at least some of each operations can also be performed on different devices.

FIG. 1 is a diagram illustrating a system for extracting signal information through image data analysis including traffic lights according to an embodiment of the present invention.

Referring to FIG. 1, a system for extracting signal information through image data analysis including traffic lights according to the embodiment of the present invention includes an apparatus 100 for extracting signal information, a user terminal 200, and an external server 300.

Here, the system for extracting signal information including traffic lights illustrated in FIG. 1 is based on the embodiment, and components of the system are not limited to the embodiment illustrated in FIG. 1, and may be added, changed, or removed as necessary.

In one embodiment, the apparatus 100 for extracting signal information may use image data obtained by capturing an image in front of the vehicle 10 and a traveling route of the vehicle 10 to extract signal information necessary to assist traveling of the vehicle 10. For example, the apparatus 100 for extracting signal information may identify traffic lights included in the image data by analyzing image data using an image analysis model, and may extract the signal information (e.g., red signal, yellow signal, green signal, left turn, etc.) from the identified traffic lights.

In various embodiments, the apparatus 100 for extracting signal information may not only extract signal information through image data analysis, but also may provide a driver assistance function that assists a driver in driving the vehicle 10 based on the extracted signal information. For example, when a driver does not start driving the vehicle 10 despite a signal being changed from a red signal to a green signal, the apparatus 100 for extracting signal information may provide a departure notification so that the vehicle may travel smoothly. In addition, when the vehicle 10 is an autonomous driving vehicle or operating an autonomous driving function, the apparatus 100 for extracting signal information may determine a control command for controlling the operation (stop, start, etc.) of the vehicle 10 based on the signal information.

In various embodiments, the apparatus 100 for extracting signal information may be connected to the user terminal 200 through a network 400, and may provide the signal information extracted through image data analysis to the user terminal 200, or provide a driver assistance function (e.g., a function to provide a departure notification, etc.) based on the signal information.

Here, the user terminal 200 is a wireless communication apparatus in which portability and mobility are guaranteed, and examples thereof may include all types of handheld-based wireless communication devices such as a navigation system, a personal communication system (PCS), a global system for mobile communication (GSM), a personal digital cellular (PDC), a personal handyphone system (PHS), personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, a tablet PC, and the like, but is not limited thereto, and the user terminal 200 may be an infotainment system for a vehicle provided in the vehicle 10.

In addition, here, the network 400 refers to a connection structure in which information exchange is possible between each node such as a plurality of terminals and servers, and examples of such a network may include a local area network (LAN), a wide area network (WAN), the Internet (WWW: World Wide Web), a wired/wireless data communication network, a telephone network, a wired/wireless television communication network, and the like. Here, the wireless data communication network includes 3G, 4G, 5G, 3rd Generation Partnership Project (3GPP), 5th Generation Partnership Project (5GPP), Long Term Evolution (LTE), World Interoperability for Microwave Access (WiMAX), Wireless Fidelity (Wi-Fi), Internet, a local area network (LAN), a wireless local area network (Wireless LAN), a wide area network (WAN), a personal area network (PAN), radio frequency (RF), a Bluetooth network, a near-field communication (NFC) network, a satellite broadcast network, an analog broadcast network, a digital multimedia broadcasting (DMB) network, or the like, but are not limited thereto.

In an embodiment, the external server 300 may be connected to the apparatus 100 for extracting signal information through the network 400, and the apparatus 100 for extracting signal information may collect and store information/data necessary to perform the process of extracting signal information through image data analysis including traffic lights and information/data (e.g., location data of traffic lights for each traveling route) generated by performing the process of extracting signal information through image data analysis including traffic lights. Hereinafter, a hardware configuration of the apparatus 100 for extracting signal information for performing the process of extracting signal information through image data analysis including traffic lights will be described with reference to FIG. 2.

Figure 2:
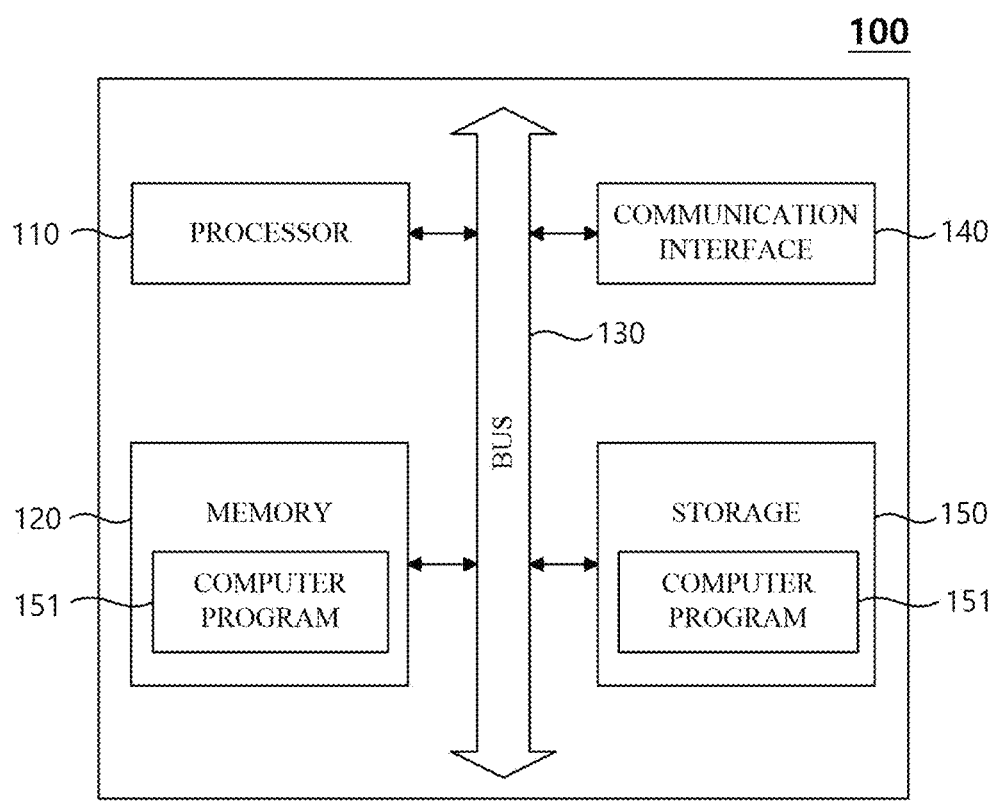
FIG. 2 is a hardware configuration diagram of an apparatus for extracting signal information through image data analysis including traffic lights according to another embodiment of the present invention.

FIG. 2 is a hardware configuration diagram of an apparatus for extracting signal information through image data analysis including traffic lights according to another embodiment of the present invention.

Referring to FIG. 2, the apparatus 100 (hereinafter, "computing apparatus 100") for extracting signal information through image data analysis including traffic lights according to another embodiment of the present invention may include one or more processors 110, a memory 120 into which a computer program 151 executed by the processor 110 is loaded, a bus 130, a communication interface 140, and a storage 150 storing the computer program 151. Here, only the components related to the embodiment of the present invention are illustrated in FIG. 2. Accordingly, one of ordinary skill in the art to which the present invention pertains may understand other general-purpose components other than the components illustrated in FIG. 2 may be further included.

The processor 110 controls the overall operation of each configuration of the computing apparatus 100. The processor 110 may be configured to include a central processing unit (CPU), a micro processor unit (MPU), a micro controller unit (MCU), a graphics processing unit (GPU), or any type of processor well known in the technical field of the present invention.

In addition, the processor 110 may perform an operation for at least one application or program for executing the method according to the embodiments of the present invention, and the computing apparatus 100 may include one or more processors.

In various embodiments, the processor 110 may further include a random access memory (RAM) (not illustrated) and a read-only memory (ROM) for temporarily and/or permanently storing signals (or data) processed in the processor 110. In addition, the processor 110 may be implemented in a form of a system-on-chip (SoC) including at least one of the graphics processing unit, the RAM, and the ROM.

The memory 120 stores various types of data, commands, and/or information. The memory 120 may load the computer program 151 from the storage 150 to execute methods/operations according to various embodiments of the present invention. When the computer program 151 is loaded into the memory 120, the processor 110 may perform the methods/operations by executing one or more instructions constituting the computer program 151. The memory 120 may be implemented as a volatile memory such as RAM, but the technical scope of the present disclosure is not limited thereto.

The bus 130 provides a communication function between components of the computing apparatus 100. The bus 130 may be implemented as any type of a bus such as an address bus, a data bus, or a control bus.

The communication interface 140 supports wired/wireless Internet communication of the computing apparatus 100. In addition, the communication interface 140 may support various communication methods other than Internet communication. To this end, the communication interface 140 may include a communication module well known in the art. In some embodiments, the communication interface 140 may be omitted.

The storage 150 may non-temporarily store the computer program 151. When the computing apparatus 100 performs a process of extracting signal information through image data analysis including traffic lights, the storage 150 may store various pieces of information necessary to provide a process of extracting signal information through image data analysis including traffic lights.

The storage 150 may be configured to include a nonvolatile memory, such as a ROM, an erasable programmable ROM (EPROM), an electrically erasable programmable ROM (EEPROM), and a flash memory, a hard disk, a removable disk, or any well-known computer-readable recording medium in the art to which the present invention belongs.

The computer program 151 may include one or more instructions to, when loaded into the memory 120, cause the processor 110 to perform the methods/operations according to various embodiments of the present invention. That is, the processor 110 may perform the methods/operations according to various embodiments of the present invention by executing the one or more instructions.

In one embodiment, the computer program 151 may include one or more instructions to perform one or more instructions to perform a method of extracting signal information through image data analysis including traffic lights including collecting image data obtained by capturing an image in front of a vehicle, identifying the traffic lights by analyzing the collected image data, and extracting the signal information from the identified traffic lights.

Operations of the method or algorithm described with reference to the embodiment of the present invention may be directly implemented in hardware, in software modules executed by hardware, or in a combination thereof. The software module may reside in a RAM, a ROM, an EPROM, an EEPROM, a flash memory, a hard disk, a removable disk, a CD-ROM, or in any form of computer readable recording medium known in the art to which the invention pertains.

The components of the present invention may be embodied as a program (or application) and stored in a medium for execution in combination with a computer which is hardware. The components of the present invention may be executed in software programming or software elements, and similarly, embodiments may be implemented with programming or scripting languages such as C, C++, Java, and assembler, including various algorithms implemented in a combination of data structures, processes, routines, or other programming constructs. Functional aspects may be implemented with algorithms executed on one or more processors. Hereinafter, a method of extracting signal information through image data analysis including traffic lights performed by the computing apparatus 100 will be described with reference to FIGS. 3 to 8.

Figure 3:
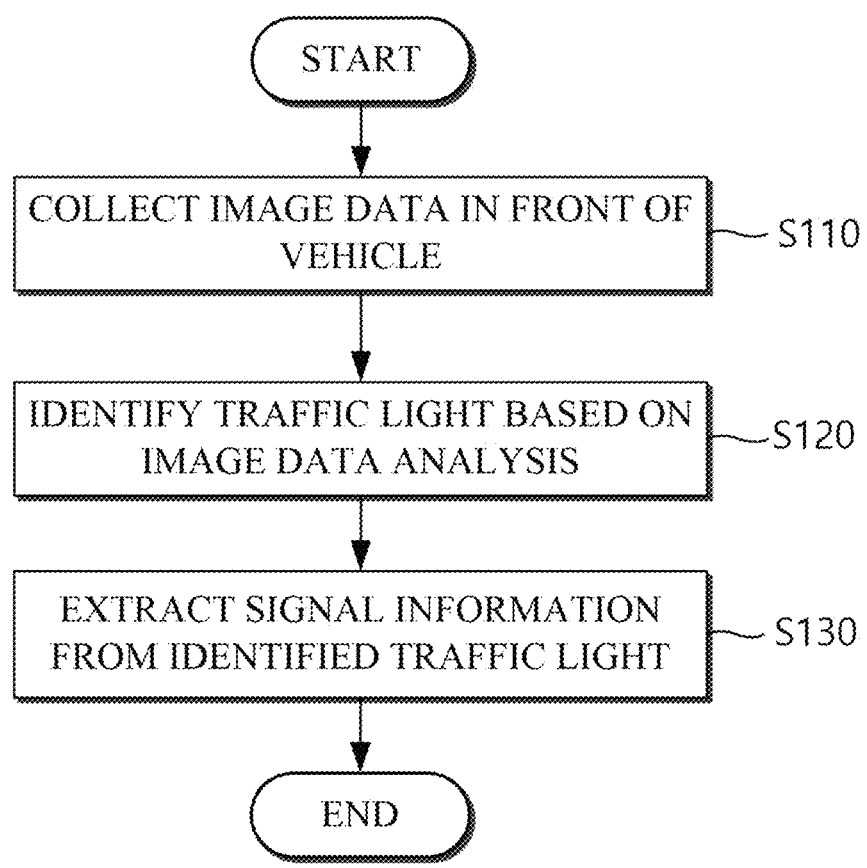
FIG. 3 is a flowchart of a method of extracting signal information through image data analysis including traffic lights according to another embodiment of the present invention.

FIG. 3 is a flowchart of a method of extracting signal information through image data analysis including traffic lights according to another embodiment of the present invention.

Here, the method of extracting signal information through image data analysis including traffic lights of FIG. 3 is to extract the signal information from the traffic lights for the purpose of providing a departure notification function among the driver assistance functions provided by the computing apparatus 100. Accordingly, the present disclosure is described assuming that the vehicle 10 is currently in a signal waiting state, but is not limited thereto, and therefore, is also applicable to the vehicle 10 currently being traveled.

Referring to FIG. 3, in operation S110, the computing apparatus 100 may collect image data obtained by capturing an image in front of the vehicle 10. For example, the computing apparatus 100 may be connected to a camera module (e.g., a black box camera module) provided in the vehicle 10 through the network 400, and collect the image data obtained by capturing the image in front of the vehicle 10 through the camera module.

In various embodiments, the computing apparatus 100 may collect the image data from the camera module every preset period. Also, the preset period may be a value preset by the user, but is not limited thereto.

In various embodiments, the computing apparatus 100 may collect the image data obtained by capturing an image in front of the vehicle 10 every $T_1$ by controlling a camera module provided in the vehicle 10, and collect image data every $T_2$ shorter than $T_1$ or collect (stream) video data in real time when traffic lights are identified from image data through operation S120 to be described below.

In operation S120, the computing apparatus 100 may identify traffic lights by analyzing the image data collected through operation S110. Also, in operation S130, the computing apparatus 100 may extract the signal information from the traffic lights identified through operation S120.

In various embodiments, the computing apparatus 100 may identify traffic lights included in the image data by analyzing the image data obtained by capturing an image in front of the vehicle 10 using a pre-trained image analysis model, and extract the signal information from the traffic lights by analyzing the image data including the identified traffic lights.

Here, the pre-trained image analysis model may be a model trained according to a machine learning-based learning method using a plurality of pieces of image data labeled with information (example: types of traffic lights, types of signal information output from traffic lights, and the like) on traffic lights as training data, and may be a model that extracts information on traffic lights included in image data using the image data as input data. For example, the pre-trained image analysis model may be a model that detects traffic lights in image data and signal information output from the traffic lights by analyzing the image data using a Convolutional Neuron Networks (CNN)-based object detection technique (e.g., yolo, Regions with Convolutional Neuron Network (RCNN), Single-Shot Detector (SSD), or similar detection algorithm), but is not limited thereto.

In various embodiments, when traffic lights are identified from image data by analyzing the image data, the computing apparatus 100 may set a region corresponding to the traffic lights in the image data as a region of interest (ROI), and may extract signal information on the vehicle 10 by analyzing only the set ROI.

For example, when the traffic lights are identified by analyzing the image data collected at a first time point, the computing apparatus 100 may extract the signal information from the identified traffic lights and simultaneously set a region in image data corresponding to the identified traffic lights as the ROI, and then, extract the signal information by cropping only a portion set as the ROI according to the analysis result of the image data collected at the first time point, with respect to the image data collected after the first time point.

In this case, the computing apparatus 100 may extract signal information by analyzing only the ROI with respect to the image data collected after the ROI for the image data is set, but initialize the setting of the ROI as the operating state of the vehicle 10 is changed from a stopping state to a traveling state, and analyze the region of the entire image data again.

In general, when the vehicle 10 waits for a signal as the signal of traffic lights is changed to a red signal, by finding the region corresponding to the traffic lights that are currently in a red state by utilizing the characteristics that the vehicle 10 remains stationary for more than 1 minute without moving, it is possible to accurately identify the traffic lights even in the environment where delays of several seconds to tens of seconds occur without unnecessarily performing a high-computational detection and recognition procedure of a traffic light.

In addition, considering that the image data collected through the vehicle 10 and the position of the ROI set in the image data are not changed because the vehicle 10 is stopped, there is no need to continuously update the position of the ROI. Accordingly, it is possible to extract signal information faster by analyzing only the ROI to efficiently extract the signal information.

In various embodiments, the computing apparatus 100 identifies the traffic lights by analyzing the image data obtained by capturing an image in front of the vehicle 10, and when a plurality of traffic lights are identified in one piece of image data, the computer device 100 may select only a traffic light for the vehicle 10, that is, a traffic light corresponding to the traveling route of the vehicle 10 among the plurality of traffic lights, and extract the signal information from only the selected traffic light. Hereinafter, a method of extracting signal information performed by the computing apparatus 100 will be described in more detail with reference to FIG. 4.

Figure 4:
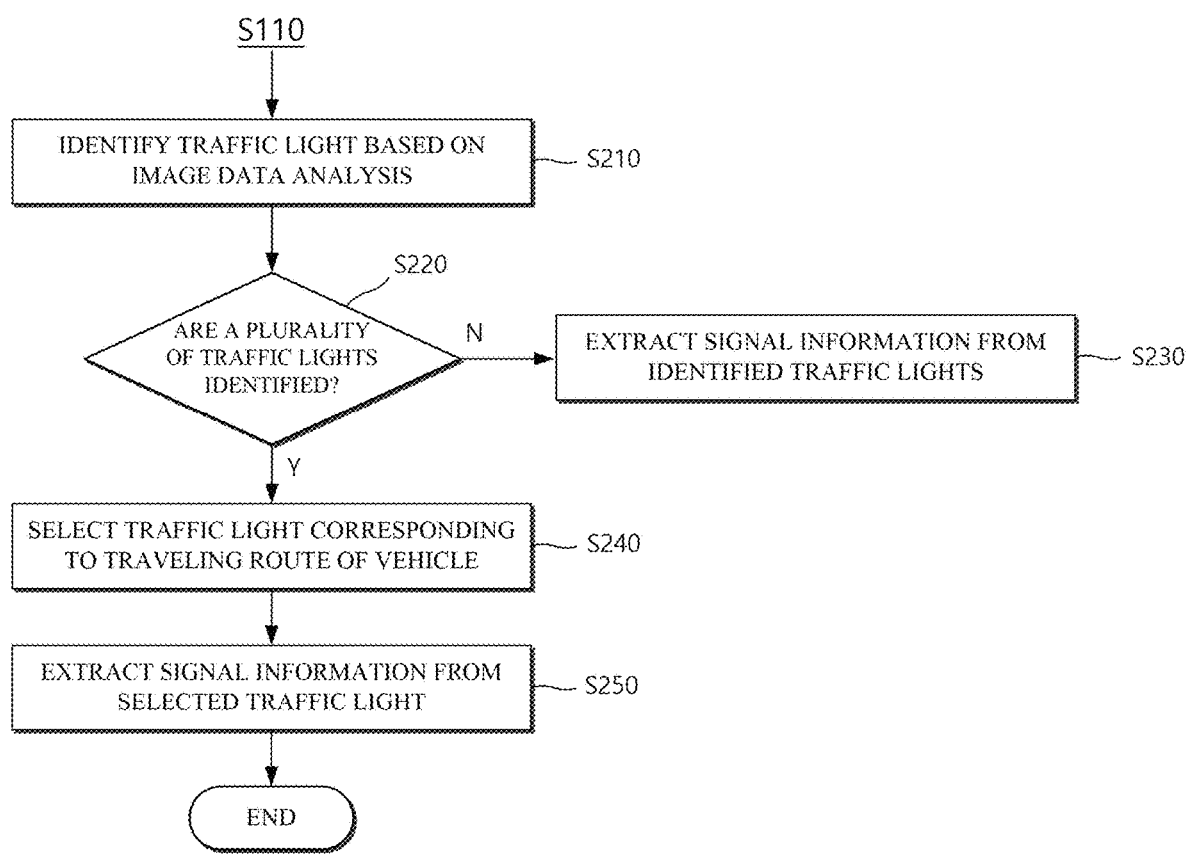
FIG. 4 is a flowchart for describing a method of extracting signal information from traffic lights corresponding to a traveling route of a vehicle according to various embodiments.

FIG. 4 is a flowchart for describing a method of extracting signal information from traffic lights corresponding to a traveling route of a vehicle according to various embodiments.

In operation S210, the computing apparatus 100 may analyze the image data obtained by capturing an image in front of the vehicle 10 to identify traffic lights included in the image data. Here, the operation of identifying traffic lights based on image data analysis performed by the computing apparatus 100 may be implemented in the same form as the operation of identifying traffic lights based on image data analysis performed in operation S120 of FIG. 3, but is not limited thereto.

In operation S220, the computing apparatus 100 may determine whether the number of traffic lights identified through operation S210 is two or more.

In operation S230, when it is determined that the number of traffic lights identified through operation S220 is one, the computing apparatus 100 may set a region corresponding to one traffic light in the image data as the ROI, and extract signal information on the vehicle 10 by analyzing only the ROI of the image data.

In operation S240, when it is determined that the number of traffic lights identified through operation S220 is two or more, the computing apparatus 100 may select traffic lights for the vehicle 10, that is, traffic lights corresponding to the traveling route of the vehicle 10 among the plurality of traffic lights.

In various embodiments, when the computing apparatus 100 identifies the plurality of traffic lights by analyzing the image data, in order to specify traffic lights outputting a signal for the traveling route of the vehicle 10 among the plurality of traffic lights, the computing apparatus 100 may generate and store the location data of the traffic lights for each traveling route in advance, and select any one of the plurality of traffic lights as the traffic lights for the vehicle 10 using the pre-stored location data of the traffic lights for each traveling route.

Meanwhile, when the location data of the traffic lights for each traveling route is not generated and stored in advance, there are no traffic lights corresponding to the traveling route of the vehicle 10 among the plurality of traffic lights identified through the image data analysis, that is, there are no traffic lights preset corresponding to the traveling route of the vehicle 10, the computing apparatus 100 may select any one of a plurality of traffic lights as the traffic light for the vehicle 10 according to a preset condition, generate the location data of the traffic lights for each traveling route using the information on any one the selected traffic lights and the traveling route of the vehicle 10, or update the pre-stored location data of the traffic lights for each traveling route.

Figure 6:
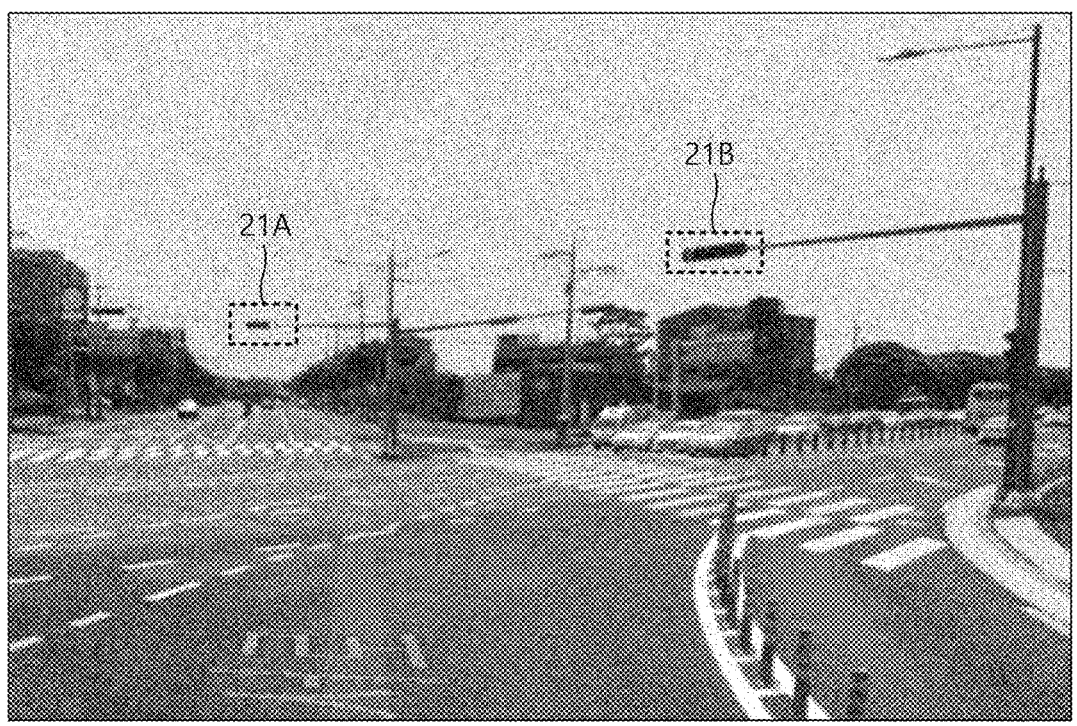
FIGS. 6-8 are diagrams exemplarily illustrating image data applicable to various embodiments.

As an example, when the computing apparatus 100 identifies the plurality of traffic lights by analyzing the image data, the computing apparatus 100 may select, as the traffic light for the vehicle 10, any one traffic light outputting signal information corresponding to a current operating state of the vehicle 10 among the plurality of traffic lights. For example, as illustrated in FIG. 6, when two traffic lights 21A and 21B are identified in the image data 20 collected from the vehicle 10 waiting for a signal at the intersection, the computing apparatus 100 may output, as the traffic signal for the vehicle 10, a traffic light outputting signal information corresponding to the current operating state of the vehicle 10, that is, a traffic light 21A outputting a red signal since the vehicle 10 is currently waiting for a signal among the two traffic lights 21A and 21B. On the other hand, when the current operating state of the vehicle 10 is the traveling state, the computing apparatus 100 may select a traffic light outputting a green signal among the two traffic lights 21A and 21B.

As another example, when the plurality of traffic lights are identified by analyzing the image data, the computing apparatus 100 may select any one of the plurality of traffic lights by comparing an operation pattern of the vehicle 10 for a predetermined period with a change pattern of signal information output from each of the plurality of identified traffic lights for a predetermined period. For example, when an operation pattern in which the vehicle 10 decelerates and stops for a predetermined period based on motion information of the vehicle 10 is shown, the computing apparatus 100 may select, as the traffic light for the vehicle 10, any one of traffic lights having a change pattern in a sequence of a green signal, a yellow signal, and a red signal or a change pattern in a sequence of a yellow signal and a red signal among the plurality of traffic lights.

Here, the movement information of the vehicle 10 may be information derived based on the image data analysis or information derived based on location information measured through a location sensor provided in the vehicle 10, but is not limited thereto.

As another example, when the plurality of traffic lights are identified by analyzing image data, the computing apparatus 100 may select any one of the plurality of traffic lights using the traveling route of the vehicle 10.

Figure 7:
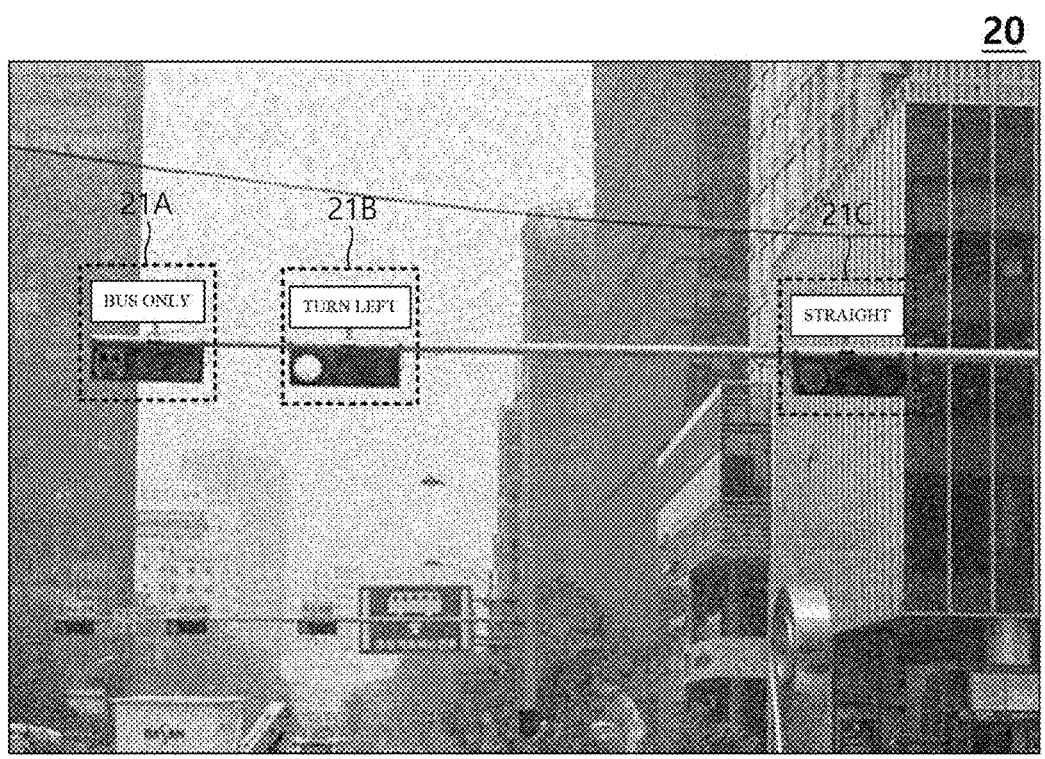

For example, as illustrated in FIG. 7, when three traffic lights 21A, 21B, and 21C are identified by analyzing the image data 20 collected from the vehicle 10 waiting for a signal to make a left turn at an intersection, the computing apparatus 100 may select, as the traffic light for the vehicle 10, the traffic light 21B that does not output a left turn signal among the three traffic lights 21A, 21B, and 21C. In addition, when three traffic lights 21A, 21B, and 21C are identified by analyzing the image data 20 collected from the vehicle 10 waiting for a signal to go straight at an intersection, the computing apparatus 100 may select, as the traffic light for the vehicle 10, the traffic light 21B that does not output a straight signal among the three traffic lights 21A, 21B, and 21C. On the other hand, the computing apparatus 100 may select traffic lights outputting a left turn signal among three traffic lights 21A, 21B, and 21C when the vehicle 10 is traveling in a left turn at an intersection, and select a traffic light outputting a straight signal among three traffic lights 21A, 21B, and 21C when the vehicle 10 is traveling in a straight line.

In various embodiments, when there are two or more traffic lights selected according to the method described above, that is, when there are two or more traffic lights corresponding to the traveling route of the vehicle 10, the computing apparatus 100 may select any one of the two or more traffic lights as the traffic light corresponding to the traveling route of the vehicle 10 using an attribute of the signal information output from each of the two or more traffic lights, at least one of road guide signs installed at adjacent locations of each of the two or more traffic lights, and an attribute of the vehicle 10.

More specifically, referring to FIG. 7, in an area where there are many lanes and a lot of vehicle traffic, a number of traffic lights performing different functions (e.g., bus-only traffic light 21A, left turn traffic light 21B, straight traffic light 21C) may be installed for smoother vehicle passage.

In this case, when a bus-only lane is located in a first lane and a left-turn lane is located in a second lane, since there is an area where the traveling route of the vehicle 10 overlaps at an intersection, the bus-only traffic light 21A and the left turn traffic light 21B may be designed to output different signals (example: when the bus-only traffic light outputs a green signal, a left-turn traffic light outputs a red signal, and when the left-turn traffic light outputs a green signal, a bus-only traffic light outputs a red signal), or in the case of the bus-only lane and the straight lane, since there is no overlapping area of the traveling route of the vehicle 10, the bus-only traffic light 21A and the straight traffic light 21C may be designed to output the same signal.

Therefore, when the computing apparatus 100 identifies three traffic lights 21A, 21B, and 21C through the image data analysis, even if the current operating state or operation pattern of the vehicle 10 is used, there may be a problem that the bus-only traffic light 21A and the straight traffic light 21C may not be clearly distinguished. That is, as illustrated in FIG. 6, when the bus-only traffic light 21A, the left turn traffic light 21B, and the straight traffic light 21C are installed individually, in the case of considering that the vehicle 10 simply waits for a signal to go straight, there is a problem that the bus-only traffic light 21A and the straight traffic light 21C that do not output the straight signal may be selected.

Figure 8:
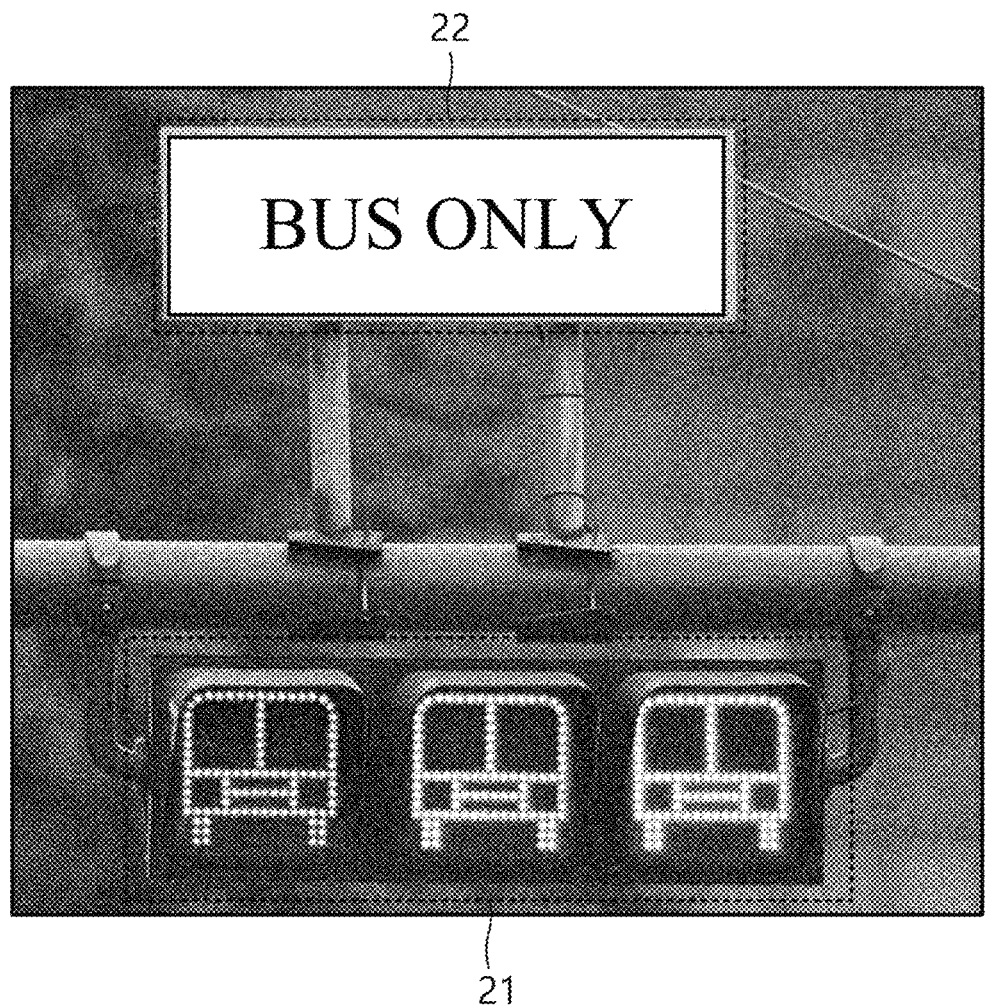

However, when the bus-only traffic light 21A, the left turn traffic light 21B, and the straight traffic light 21C are installed individually, separate devices are provided so that drivers may see clearly in which direction each traffic light is outputting a signal and which vehicle each traffic light is aimed at (example: as illustrated in FIG. 8, the shape of the output signal is different, or the road guide sign 22 is installed separately). Therefore, the computing apparatus may select any one of the two or more traffic lights as the traffic light corresponding to the traveling route of the vehicle 10 using the attribute (example: output type of a signal) of the signal information output from each of the two or more traffic lights, at least one of the road guide signs 22 (example: string analysis and image analysis results for the road guide sign 22), and the attribute (example: type (bus, passenger car, etc.) of a vehicle) of the vehicle 10.

In various embodiments, when the computing apparatus 100 identifies a plurality of traffic lights by analyzing the image data, the computing apparatus 100 may determine whether other vehicles waiting for a signal in front of the vehicle 10 start by analyzing the image data, and when it is determined that other vehicles waiting for a signal start, the computing apparatus 100 may select, as a traffic light corresponding to the vehicle 10, a traffic light whose signal information is changed from a red signal to a green signal based on when other vehicles waiting for a signal start.

In operation S250, the computing apparatus 100 may set, as the ROI, a region corresponding to one traffic light selected through operation S240 in the image data, and analyze only the ROI of the image data to extract the signal information on the vehicle 10. Hereinafter, a method of providing a departure notification using the signal information extracted according to the above method will be described with reference to FIG. 5.

Figure 5:
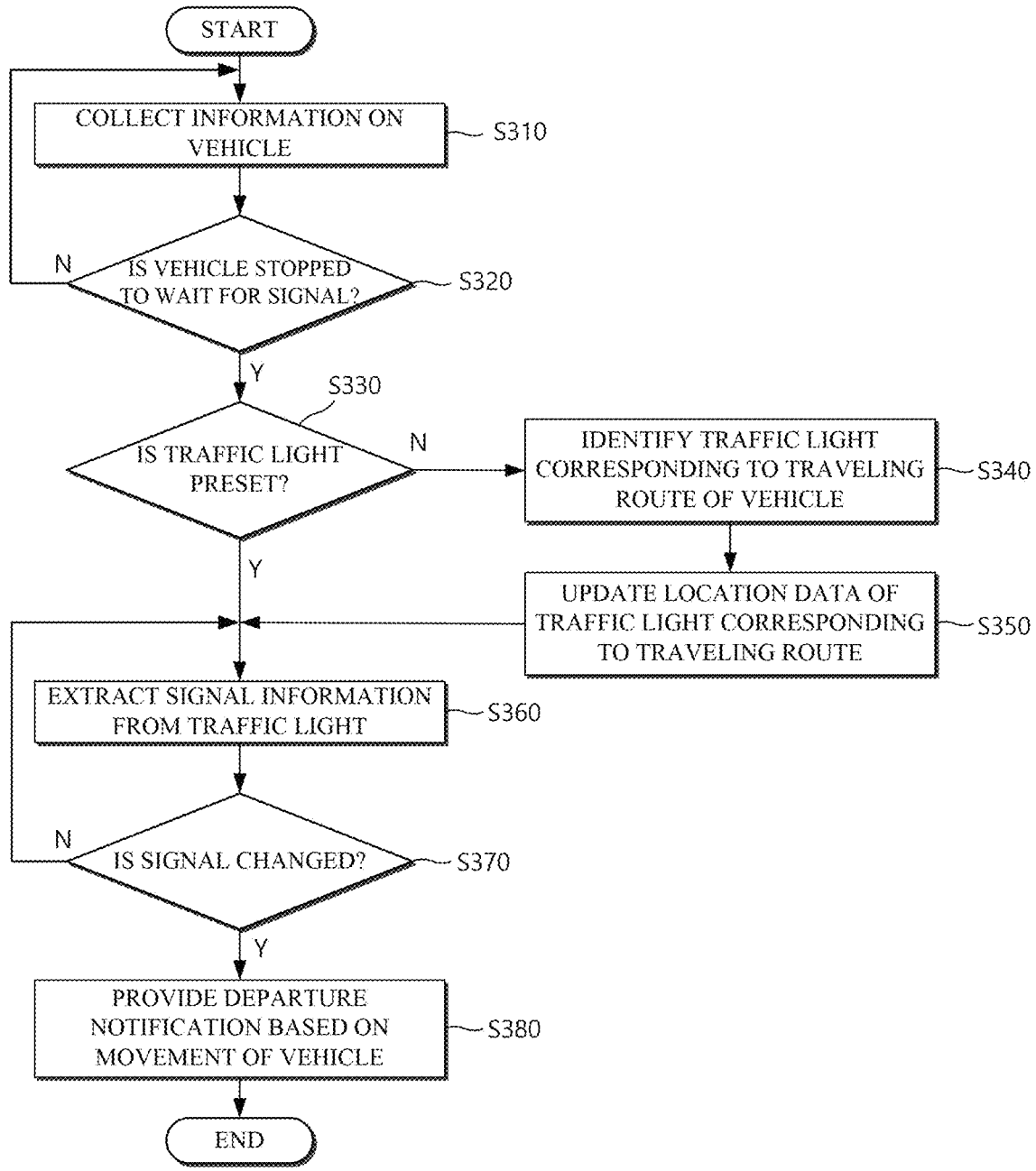
FIG. 5 is a flowchart of a method of providing a departure notification based on signal information extracted according to a traveling route of a vehicle waiting for a signal according to various embodiments.

FIG. 5 is a flowchart of a method of providing a departure notification based on signal information extracted according to a traveling route of a vehicle waiting for a signal according to various embodiments.

Referring to FIG. 5, in operation S310, the computing apparatus 100 may collect the information on the vehicle 10. Here, the information on the vehicle 10 is information for determining the movement of the vehicle 10, and may refer to image data collected through a camera module provided in the vehicle 10 and location information measured through a location sensor provided in the vehicle 10, but is not limited thereto, and any information for determining the movement of the vehicle 10 may be applied.

In operation S320, the computing apparatus 100 may determine whether the vehicle 10 is currently stopped for waiting for a signal using the information on the vehicle 10 collected through operation S310.

In various embodiments, when the computing apparatus 100 collects global positioning system (GPS) sensor information through a location sensor (GPS-IMU) provided in the vehicle 10 through operation S310, the computing apparatus 100 may determine the movement of the vehicle 10 based on the change in the coordinate values of the GPS.

In various embodiments, when the computing apparatus 100 collects sensor data from a motion sensor (e.g., a wheel encoder) that detects the traveling motion of the vehicle 10 through operation S310, the computing apparatus 100 may determine the movement of the vehicle 10 using the change in the value of the collected sensor data.

In various embodiments, when the computing apparatus 100 collects image data through a camera module provided in the vehicle 10 through operation S310, the computing apparatus 100 may analyze the collected image data to estimate the movement of the camera module based on visual odometry, and determine the movement of the vehicle 10 according to the estimated movement of the camera module.

In operation S330, when it is determined that the vehicle 10 is in a stopped state through operation S320, the computing apparatus 100 may determine whether the traffic lights corresponding to the traveling route of the vehicle 10 are preset. For example, the computing apparatus 100 may determine whether there are preset traffic lights corresponding to the traveling route of the vehicle 10 based on the pre-stored location data of the traffic lights for each traveling route.

Meanwhile, when it is determined that the vehicle 10 is in a traveling state through operation S320, the computing apparatus 100 may repeatedly perform steps S310 and S320 until it is determined that the vehicle 10 is in a stopped state.

In operation S340, when it is determined that there are no preset traffic lights corresponding to the traveling route of the vehicle 10 through operation S330, the computing apparatus 100 may analyze the image data collected from the vehicle 10 to identify the traffic lights. Here, the operation of identifying traffic lights based on image data analysis performed by the computing apparatus 100 may be implemented in the same or similar form as the operation of identifying traffic lights based on image data analysis performed in operation S120 of FIG. 3 and operations S210 to S240 of FIG. 4.

In operation S350, the computing apparatus 100 may update the pre-stored location data of the traffic lights for each traveling route using the information on the traffic lights identified through the operation S340 and the information on the traveling route of the vehicle 10. As a result, it is possible to create the environment in which the signal information may be extracted more quickly without going through operations S340 to S350 for the vehicle 10 moving along the same traveling route in the future.

In operation S360, when it is determined that there are preset traffic lights corresponding to the traveling route of the vehicle 10 through operation S330, the computing apparatus 100 may set an ROI on the image data collected from the vehicle 10 based on the preset information on the traffic lights, and may extract signal information by analyzing the set ROI.

In addition, when the traffic lights are identified from the image data collected from the vehicle 10 through operation S340, the computing apparatus 100 may set a region corresponding to the traffic lights identified in the image data as the ROI, and extract signal information by analyzing the set ROI. Here, the operation of extracting signal information may be implemented in the same or similar form as the operation of extracting signal information performed in operation S130 of FIG. 3 and operation S250 of FIG. 4.

In operation S370, the computing apparatus 100 may detect a change in signals output from traffic lights using the signal information extracted through operation S360. For example, the computing apparatus 100 may extract signal information by analyzing image data collected every preset period, and may detect a change in a signal by comparing the extracted signal information.

In operation S380, when the change in the signal is detected through operation S370, that is, when the signal information output from traffic lights is changed from a red signal to a green signal, the computing apparatus 100 provides a departure notification to the vehicle 10.

In various embodiments, when the movement of the vehicle 10 is not detected until a preset time is exceeded based on the time when the change in the signal is detected, the computing apparatus 100 may provide a departure notification guiding the departure of the vehicle 10. That is, by providing the departure notification guiding the departure of the vehicle 10 only when it is determined that the driver of the vehicle 10 does not recognize the change in the signal, it is possible to prevent the driver from experiencing inconvenience by providing the departure notification even in a situation where the driver recognizes the change in the signal.

In this case, the computing apparatus 100 may determine an attribute (e.g., a type of departure notification, a strength (size) of the provided departure notification, a length, the number of times of providing the departure notification, the period of providing the departure notification, etc.) of the departure notification to be provided to the vehicle 10 based on the length of the time when the movement of the vehicle 10 is not detected. For example, the computing apparatus 100 may provide the departure notification in the form of vibrations or a voice when the length of the time that the movement of the vehicle 10 is not detected is the first length based on the time when the change in the signal is detected, and may simultaneously provide the departure notification in the form of vibration and the departure notification in the form of a voice when the second length is longer than the first length.

The above-described method of extracting signal information through image data analysis including traffic lights has been described with reference to the flowchart illustrated in the drawings. For a simple description, the method of extracting signal information through image data analysis including traffic lights has been described as a series of blocks, but the present disclosure is not limited to the order of the blocks, and some blocks may be performed in an order different from that illustrated and performed herein, or may be performed concurrently. In addition, new blocks not described in the present specification and drawings may be added, or some blocks may be deleted or changed.

According to various embodiments of the present invention, it is possible to more accurately extract signal information corresponding to the traveling route of the vehicle by accurately identifying traffic lights corresponding to a vehicle only using image data obtained by capturing an image in front of the vehicle and a traveling route of the vehicle and extracting signal information from the identified traffic lights, that is, only by a relatively simple operation without using a precision map or a high-performance computing apparatus.

In addition, it is possible to improve power efficiency according to performing a relatively low-computational operation as well as preventing a situation where a flow of traffic is obstructed by missing a departure signal due to a vehicle driver's negligence by determining a driving control command of an autonomous vehicle in some cases as well as providing a departure notification for a vehicle waiting for a signal using signal information extracted from image data.

The effects of the present invention are not limited to the above-described effects, and other effects that are not mentioned may be obviously understood by those skilled in the art from the above detailed description.

Although embodiments of the present invention have been described with reference to the accompanying drawings, those skilled in the art will appreciate that various modifications and alterations may be made without departing from the spirit or essential feature of the present invention. Therefore, it should be understood that the above-mentioned embodiments are not restrictive but are exemplary in all aspects.

What is claimed is:

1. A method of extracting, by a computing apparatus, signal information through image data analysis including a traffic light, the method comprising:
capturing, by a camera module provided in a vehicle, an image in front of the vehicle, and collecting, by the computing apparatus connected to the camera module, image data of the captured image;
identifying a traffic light by analyzing the collected image data;
extracting signal information from the identified traffic light; and
providing, by the computing apparatus, to the vehicle that is waiting for a signal, a departure notification, based on the extracted signal information and movement information of the vehicle, or determining, by the computing apparatus, a driving control command of the vehicle, based on the extracted signal information,
wherein the identifying of the traffic light includes: selecting any one of a plurality of identified traffic lights by comparing an operation pattern of the vehicle for a predetermined period and a change pattern of the signal information, output from each of the plurality of identified traffic lights, for the predetermined period, when the plurality of traffic lights are identified by analyzing the collected image data; and setting a region corresponding to any one of the selected traffic lights as a region of interest (ROI) in the collected image data,
wherein the extracting of the signal information includes extracting the signal information on the vehicle by analyzing only the set ROI, and
wherein the identifying of the traffic light comprises: selecting any one of the plurality of identified traffic lights based on a traveling route of the vehicle when the plurality of traffic lights are identified by analyzing the collected image data; when two or more traffic lights are selected as being corresponding to the traveling route of the vehicle, selecting one traffic light of the two or more traffic lights based on an output form of the signal information and also based on road guide signs installed at locations adjacent to each of the two or more traffic lights; and setting a region corresponding to the selected one traffic light in the collected image data as the ROI.

2. The method of claim 1, wherein the extracting of the signal information includes determining whether a first vehicle is waiting for a signal using location information of the first vehicle collected through a location sensor provided in the first vehicle, and extracting the signal information from the identified traffic light in response to the determination that the first vehicle is waiting for the signal.

3. The method of claim 1, wherein the extracting of the signal information includes determining whether a first vehicle is waiting for the signal by analyzing the image data obtained by capturing the image in front of the first vehicle, and extracting the signal information from the identified traffic light in response to determining that the first vehicle is waiting for the signal.

4. The method of claim 1, wherein the identifying of the traffic light includes: selecting any one traffic light outputting signal information corresponding to a current operating state of the vehicle from the plurality of identified traffic lights when the plurality of traffic lights are identified by analyzing the collected image data; and setting a region corresponding to any one of the selected traffic lights as the ROI in the collected image data.

5. The method of claim 1, wherein the identifying of the traffic light includes:
when the plurality of traffic lights are identified by analyzing the collected image data, setting a region corresponding to a preset traffic light as the ROI in the collected image data when there is the preset traffic light corresponding to the traveling route of the vehicle among the plurality of identified traffic lights based on location data of traffic lights for each pre-stored traveling route; and
when there is no preset traffic light corresponding to the traveling route of the vehicle among the plurality of identified traffic lights, selecting any one of the plurality of identified traffic lights using the traveling route of the vehicle and signal information output from the plurality of identified traffic lights, setting a region corresponding to any one of the selected traffic lights as the ROI in the collected image data, and updating the location data of the traffic lights for each pre-stored traveling route using information on the traveling route of the vehicle and any one of the selected traffic lights.

6. The method of claim 1,
wherein the providing of the departure notification includes providing the departure notification for guiding departure of the vehicle when the movement of the vehicle is not detected until a preset time is exceeded based on a time when the extracted signal information changes from a red signal to a green signal and determining an attribute of the departure notification to be provided to the vehicle based on a length of time that the movement of the vehicle is not detected.

7. An apparatus for extracting signal information through image data analysis including a traffic light, the apparatus comprising:
a processor;
a network interface;
a memory; and
a computer program loaded into the memory and executed by the processor,
wherein the computer program includes:
an instruction to capture, by a camera module provided in a vehicle, an image in front of the vehicle, and collect, by the computing apparatus connected to the camera module, image data of the captured image;
an instruction to identify the traffic light by analyzing the collected image data;
an instruction to extract signal information from the identified traffic light; and
an instruction to provide, by the computing apparatus, to the vehicle that is waiting for a signal, a departure notification, based on the extracted signal information and movement information of the vehicle, or determine, by the computing apparatus, a driving control command of the vehicle, based on the extracted signal information,
wherein the instruction to identify the traffic light includes: an instruction to select any one of a plurality of identified traffic lights by comparing an operation pattern of the vehicle for a predetermined period and a change pattern of the signal information, output from each of the plurality of identified traffic lights, for the predetermined period, when the plurality of traffic lights are identified by analyzing the collected image data; and an instruction to set a region corresponding to any one of the selected traffic lights as a region of interest (ROI) in the collected image data, and
wherein the instruction to extract the signal information includes an instruction to extract the signal information on the vehicle by analyzing only the set ROI, and
wherein the instruction to identify comprises: an instruction to select any one of the plurality of identified traffic lights based on a traveling route of the vehicle when the plurality of traffic lights are identified by analyzing the collected image data; an instruction to, when two or more traffic lights are selected as being corresponding to the traveling route of the vehicle, select one traffic light of the two or more traffic lights based on an output form of the signal information and also based on road guide signs installed at locations adjacent to each of the two or more traffic lights; and an instruction to set a region corresponding to the selected one traffic light in the collected image data as the ROI.

8. A non-transitory computer-readable medium having stored therein a computer program for causing a computing apparatus to execute the following operations of:
capturing, by a camera module provided in a vehicle, an image in front of the vehicle, and collecting, by the computing apparatus connected to the camera module, image data of the captured image;
identifying a traffic light by analyzing the collected image data;
extracting signal information from the identified traffic light; and
providing, by the computing apparatus, to the vehicle that is waiting for a signal, a departure notification, based on the extracted signal information and movement information of the vehicle, or determining, by the computing apparatus, a driving control command of the vehicle, based on the extracted signal information,
wherein the identifying of the traffic light includes: selecting any one of a plurality of identified traffic lights by comparing an operation pattern of the vehicle for a predetermined period and a change pattern of the signal information, output from each of the plurality of identified traffic lights, for the predetermined period, when the plurality of traffic lights are identified by analyzing the collected image data; and setting a region corresponding to any one of the selected traffic lights as a region of interest (ROI) in the collected image data, and
wherein the extracting of the signal information includes extracting the signal information on the vehicle by analyzing only the set ROI, and
wherein the identifying of the traffic light comprises: selecting any one of the plurality of identified traffic lights based on a traveling route of the vehicle when the plurality of traffic lights are identified by analyzing the collected image data; when two or more traffic lights are selected as being corresponding to the traveling route of the vehicle, selecting one traffic light of the two or more traffic lights based on an output form of the signal information and also based on road guide signs installed at locations adjacent to each of the two or more traffic lights; and setting a region corresponding to the selected one traffic light in the collected image data as the ROI.

* * * * *